(12) United States Patent
Hsu et al.

(10) Patent No.: US 11,746,466 B2
(45) Date of Patent: *Sep. 5, 2023

(54) WATER-REPELLENT RESIN, WATER-REPELLENT FABRIC, AND FABRICATING METHOD THEREOF

(71) Applicant: TAIWAN TEXTILE RESEARCH INSTITUTE, New Taipei (TW)

(72) Inventors: Chen-Shou Hsu, New Taipei (TW); Sun-Wen Juan, New Taipei (TW); Chun-Hung Lin, New Taipei (TW)

(73) Assignee: TAIWAN TEXTILE RESEARCH INSTITUTE, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/567,503

(22) Filed: Jan. 3, 2022

(65) Prior Publication Data

US 2022/0235517 A1 Jul. 28, 2022

(30) Foreign Application Priority Data

Jan. 28, 2021 (TW) .................. 110103308

(51) Int. Cl.
*D06N 3/12* (2006.01)
*C08G 65/333* (2006.01)

(52) U.S. Cl.
CPC ......... *D06N 3/12* (2013.01); *C08G 65/33375* (2013.01); *D06N 2209/142* (2013.01); *D10B 2401/021* (2013.01)

(58) Field of Classification Search
None
See application file for complete search history.

(56) References Cited

U.S. PATENT DOCUMENTS

| 9,260,605 | B2 | 2/2016 | Sworen et al. |
| 9,708,757 | B2 | 7/2017 | Viladot Petit et al. |
| 10,138,392 | B2 | 11/2018 | Sworen et al. |
| 11,486,088 | B2* | 11/2022 | Hsu ............ C08G 18/791 |
| 2009/0029140 | A1 | 1/2009 | Haberle et al. |
| 2012/0045496 | A1 | 2/2012 | Short et al. |
| 2014/0295724 | A1 | 10/2014 | Sworen et al. |

(Continued)

FOREIGN PATENT DOCUMENTS

| CN | 101379240 A | 3/2009 |
| CN | 105358760 A | 2/2016 |

(Continued)

*Primary Examiner* — Arti Singh-Pandey
(74) *Attorney, Agent, or Firm* — McClure, Qualey & Rodack, LLP

(57) ABSTRACT

A water-repellent fabric includes a base cloth and a water-repellent resin. The water-repellent resin is disposed on the base cloth, in which a method of fabricating the water-repellent resin includes the following steps. A first thermal process is performed to mix a polyol, a cross-linking agent, and a choline to form a first mixture, in which a reaction temperature of the first thermal process is between 90° C. and 120° C. A second thermal process is performed to mix the first mixture and a water repellent to form the water-repellent resin, in which the water repellent includes a hydroxyl group, an amino group, or combinations thereof, and a reaction temperature of the second thermal process is between 120° C. and 150° C.

10 Claims, 1 Drawing Sheet

(56) References Cited

U.S. PATENT DOCUMENTS

2016/0194821 A1  7/2016  Jost
2019/0256739 A1  8/2019  Brown et al.

FOREIGN PATENT DOCUMENTS

| CN | 105377935 A | 3/2016 |
| CN | 107675278 A | 2/2018 |
| CN | 109153908 A | 1/2019 |
| EP | 3 460 021 A1 | 3/2019 |
| TW | 201443153 A | 11/2014 |
| WO | 2014160905 A1 | 10/2014 |
| WO | 2015191326 A1 | 12/2015 |

* cited by examiner

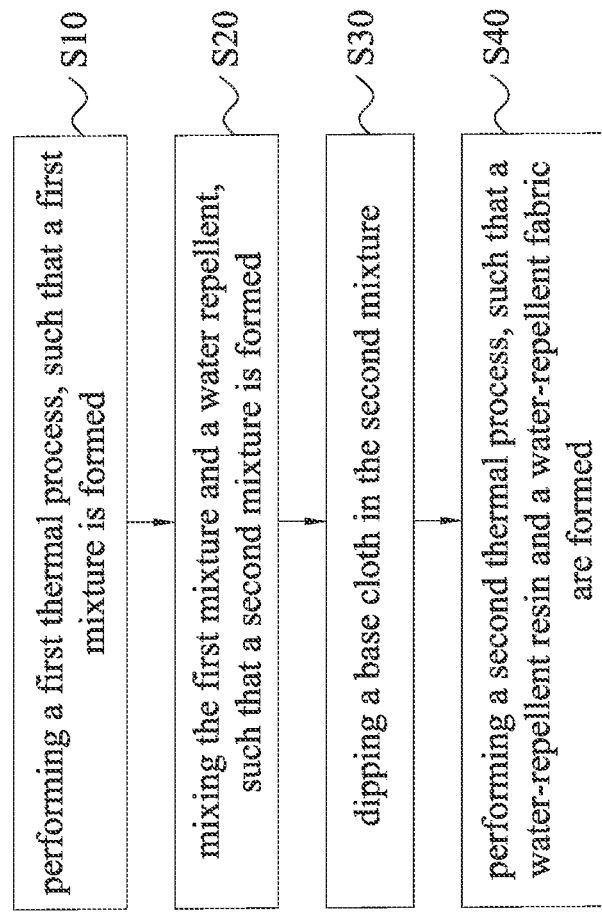

WATER-REPELLENT RESIN, WATER-REPELLENT FABRIC, AND FABRICATING METHOD THEREOF

RELATED APPLICATION

This application claims priority to Taiwan Application Serial Number 110103308, filed Jan. 28, 2021, which is herein incorporated by reference.

BACKGROUND

Field of Invention

The present disclosure relates to a textile material, and particularly relates to a water-repellent resin, a water-repellent fabric fabricated by the water-repellent resin, and a fabricating method of the water-repellent fabric.

Description of Related Art

With the improvement of the living standard in today's society, people's demand for functional textiles gradually increases, and with the continuous coming out of the various functional textiles, the development of the functional textiles with specific purposes has also become more and more complete.

In the field of water-repellent textiles, most textiles currently on the market that have a water-repellent effect cannot have good anti-staining and antibacterial effects, and as the number of wearing times increases, the water-repellent function gradually degrades and cannot meet the needs of users. Therefore, how to make textiles have good water-repellency and anti-staining effect and maintain their functions is an important issue for the textile industry.

SUMMARY

According to some embodiments of the present disclosure, a water-repellent fabric includes a base cloth and a water-repellent resin. The water-repellent resin is disposed on the base cloth, in which a method of fabricating the water-repellent resin includes the following steps. A first thermal process is performed to mix a polyol, a cross-linking agent, and a choline to form a first mixture, in which a reaction temperature of the first thermal process is between 90° C. and 120° C. A second thermal process is performed to mix the first mixture and a water repellent to form the water-repellent resin, in which the water repellent includes a hydroxyl group, an amino group, or combinations thereof, and a reaction temperature of the second thermal process is between 120° C. and 150° C.

In some embodiments of the present disclosure, the cross-linking agent includes a structural unit represented by formula (1),

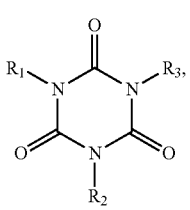

formula (1)

in which any two or more of the $R_1$, $R_2$, and $R_3$ includes a structural unit represented by formula (2),

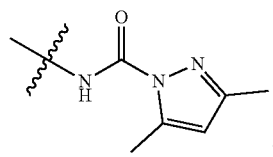

formula (2)

In some embodiments of the present disclosure, the base cloth has a plurality of yarns interwoven with each other, and the water-repellent resin wraps each of the yarns.

In some embodiments of the present disclosure, the base cloth has at least two layers, and the water-repellent resin is disposed between the two layers of the base cloth.

According to some embodiments of the present disclosure, a fabricating method of a water-repellent fabric includes the following steps. A first thermal process is performed to mix a polyol, a cross-linking agent, and a choline, such that a first mixture is formed, in which a reaction temperature of the first thermal process is between 90° C. and 120° C. The first mixture and a water repellent are mixed, such that a second mixture is formed, in which the water repellent comprises a hydroxyl group, an amino group, or combinations thereof. A base cloth is dipped in the second mixture, such that the second mixture covers the base cloth and infiltrates into the base cloth. A second thermal process is performed, such that the second mixture is formed into a water-repellent resin, and the water-repellent resin is disposed on the base cloth, in which a reaction temperature of the second thermal process is between 120° C. and 150° C.

In some embodiments of the present disclosure, in the first thermal process, the cross-linking agent reacts with the polyol and the choline, such that the first mixture is formed.

In some embodiments of the present disclosure, performing the first thermal process includes the following steps. A first front-end thermal process is performed to mix the polyol and the cross-linking agent, such that a first precursor is formed. A first back-end thermal process is performed to mix the choline and the first precursor, such that the first mixture is formed.

In some embodiments of the present disclosure, a reaction time of the first thermal process is between 20 minutes and 30 minutes, and a reaction time of the second thermal process is between 2 minutes and 5 minutes.

According to some embodiments of the present disclosure, a water-repellent resin is fabricated by a fabricating method including the following steps. A first thermal process is performed to mix a polyol, a cross-linking agent, and a choline, such that a first mixture is formed, in which a reaction temperature of the first thermal process is between 90° C. and 120° C. A second thermal process is performed to mix the first mixture and a water repellent, such that the water-repellent resin is formed, in which the water repellent comprises a hydroxyl group, an amino group, or combinations thereof, and a reaction temperature of the second thermal process is between 120° C. and 150° C.

In some embodiments of the present disclosure, an average molecular weight of the polyol is between 60 g/mole and 400 g/mole.

In the aforementioned embodiments of the present disclosure, the water-repellent fabric of the present disclosure includes the base cloth and the water-repellent resin, and the water-repellent resin is firmly disposed on the base cloth, thereby improving the water repellency, the anti-staining effect, and the washing fastness of the water-repellent fabric. During the fabricating process of the water-repellent fabric, the cross-linking agent can be ensured to undergo a segmented reaction by adjusting the reaction temperature of each stage of the two-stage thermal process, such that the subsequently formed water-repellent resin has a complicated network structure and is firmly disposed on the base cloth, which is beneficial for improving the water repellency, the anti-staining effect, and the washing fastness of the water-repellent fabric. Accordingly, the water-repellent fabric of the present disclosure can maintain its functions well after multiple times of washing, and can be widely used in the field of functional apparel textiles.

BRIEF DESCRIPTION OF THE DRAWINGS

The disclosure can be more fully understood by reading the following detailed description of the embodiments, with reference made to the accompanying drawings as follows:

FIG. 1 is a flowchart illustrating a fabricating method of a water-repellent fabric according to some embodiments of the present disclosure.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

In the present disclosure, the structure of a polymer or a functional group is sometimes represented by a skeleton formula. This representation can omit carbon atoms, hydrogen atoms, and carbon-hydrogen bonds. Certainly, if the atom or atom group is clearly drawn in the structural formula, the drawing shall prevail.

The present disclosure provides a water-repellent resin which can be firmly disposed on a base cloth, such that the water repellency, the anti-staining effect, and the washing fastness of the water-repellent fabric fabricated by the water-repellent resin can be improved. Compared to the conventional water-repellent fabric, the water-repellent fabric of the present disclosure can well maintain its water repellency and anti-staining effect after multiple times of washing, thereby effectively solving the problem of poor washing fastness and short lifespan of the conventional water-repellent fabric.

FIG. 1 is a flowchart illustrating a fabricating method of a water-repellent fabric according to some embodiments of the present disclosure. Reference is made to FIG. 1. The fabricating method of the water-repellent fabric includes steps S10, S20, S30, and S40. In step S10, a first thermal process is performed, such that a first mixture is formed. In step S20, the first mixture and a water repellent are mixed, such that a second mixture is formed. In step S30, a base cloth is dipped in the second mixture. In step S40, a second thermal process is performed, such that a water-repellent resin and a water-repellent fabric are formed. The aforementioned steps will further be discussed in the following descriptions.

Firstly, a polyol, a cross-linking agent, and a choline are provided. In some embodiments, the polyol may be, for example, polyethylene glycol (PEG), polypropylene glycol (PPG), poly(tetramethylene ether) glycol (PTMEG), or combinations thereof. In some embodiments, an average molecular weight of the polyol may be between 60 g/mole and 400 g/mole.

In some embodiments, the cross-linking agent may include isocyanate trimer. Specifically, the cross-linking agent may include a structural unit represented by formula (1),

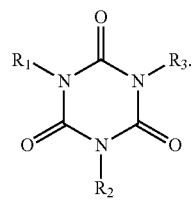

formula (1)

In some embodiments, the cross-linking agent may include aliphatic isocyanate (e.g., HDI, TMDI, or XDI) trimer, alicyclic isocyanate (e.g., IPDI, HMDI or, HTDI) trimer, aromatic isocyanate (e.g., TDI or MDI) trimer, or combinations thereof. In some embodiments, at least two terminals of the isocyanate trimer may have functional groups such as 3,5-dimethylpyrazole (DMP). Specifically, in the cross-linking agent represented by formula (1), any two or more of R1, R2, and R3 include a structural unit represented by formula (2),

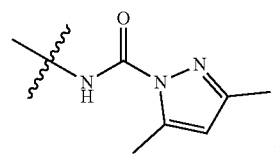

formula (2)

In some embodiments, choline may be, for example, an alcohol (amine) having a zwitterionic group. Specifically, choline may include a structural unit represented by formula (3),

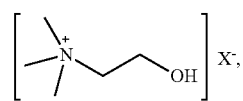

formula (3)

in which $X^-$ may be, for example, a counterion that keeps the choline neutral, such as $Cl^-$, OH, or tartrate. The zwitterionic group of the choline can be preserved in the water-repellent resin formed subsequently to provide the water-repellent resin with a good anti-staining effect.

Next, the first thermal process is performed in step S10 to mix the polyol, the cross-linking agent, and the choline, such that the first mixture is formed, in which a reaction temperature of the first thermal process is between 90° C. and 120° C. In some embodiments, a usage amount of the polyol may be between 0.05 parts by weight and 0.35 parts by weight, a usage amount of the cross-linking agent may be between 1 part by weight and 7 parts by weight, and a usage amount of choline may be between 0.05 parts by weight and 0.35 parts by weight. In some embodiments, a reaction time of the first thermal process may be between 20 minutes and 30 minutes, so as to ensure that the reaction proceeds to a certain extent. In some embodiments, performing the first thermal process may include sequentially performing a first front-end thermal process and a first back-end thermal process.

In some embodiments, the step of the first front-end thermal process includes mixing the polyol and the cross-linking agent to form a first precursor. In detail, during the first front-end thermal process, the cross-linking agent can react with the polyol to form the first precursor. In some embodiments, a reaction time of the first front-end thermal process may be between 10 minutes and 20 minutes. As mentioned above, since in some embodiments, the average molecular weight of the polyol may be between 60 g/mole and 400 g/mole, the water-repellent fabric formed subsequently can have good water repellency, anti-staining effect, washing fastness, and softness, and the manufacturing costs can be effectively reduced. Specifically, if the average molecular weight of the polyol is less than 60 g/mole, the water-repellent resin formed subsequently may not be firmly disposed on the base cloth, and hence the water-repellent fabric has poor water repellency, anti-staining effect, and washing fastness; and if the average molecular weight of the polyol is greater than 400 g/mole, the water-repellent fabric may have poor water repellency and softness, and the required reaction time is likely to increase, which is not beneficial for reducing the manufacturing costs.

In some embodiments, the step of the first back-end thermal process includes mixing the first precursor and the choline to form the first mixture. In detail, during the first back-end thermal process, the unreacted cross-linking agent and/or the first precursor may further react with the polyol and/or the choline to form the first mixture. In some embodiments, a reaction time of the first back-end thermal process may be between 5 minutes and 15 minutes. In some embodiments, since the polyol may have a larger average molecular weight than the choline, the polyol is preferentially selected for reaction during the first thermal process, such that the reaction is ensured to proceed completely, thereby avoiding the oily substance formed by the unreacted polyol from further affecting the fabrication of the water-repellent fabric.

Then, mixing the first mixture and the water repellent in step S20 to form a second mixture, in which the water repellent includes a hydroxyl group, an amino group, or combinations thereof. The aforementioned functional groups included in the water repellent can improve the reactivity of the water repellent during the subsequent thermal process, and the water repellent can provide the subsequently formed water-repellent resin with good water repellency. In some embodiments, the water repellent may be, for example, a fluorine-free water repellent to improve environmental friendliness. Specifically, the water repellent can be P794W (trade name, purchased from NANPAO Resin Chemical Co., Ltd.), Rudolf Eco+ (trade name, purchased from Rudolf Company), HeiQ Eco-Dry (trade name, purchased from HeiQ Company), Bio DWR 2.0 (trade name, purchased from JINTEX Chemical Co., Ltd.), or combinations thereof. In some embodiments, a usage amount of water repellent may be between 3 parts by weight and 9 parts by weight.

After that, dipping the base cloth in the second mixture in step S30, such that the second mixture covers the base cloth and infiltrates into the base cloth, in which the base cloth may include knitted fabric, woven fabric, non-woven fabric, etc. In detail, when the base cloth is dipped in the second mixture, each ingredient in the second mixture can be attached to the surface of each fiber or yarn. In some embodiments, a base material of the base cloth may be, for example, polyethylene terephthalate, so as to prevent the base cloth from chemically reacting with the ingredients in the second mixture during the subsequent thermal process. In some embodiments, double rollers may be used in a padding process of the base cloth after dipping, so as to remove the excess second mixture on the surface of the base cloth.

Next, the second thermal process is performed in step S40 to form the water-repellent resin and the water-repellent fabric, in which a reaction temperature of the second thermal process is between 120° C. and 150° C. In some embodiments, the reaction time of the second thermal process may be between 2 minutes and 5 minutes, so as to meet the requirements of the post-treatment of the industry. In detail, during the second thermal process, the ingredients in the second mixture attached to the surface of the yarn can react with each other to crosslink with each other, so as to form the water-repellent resin, and the water-repellent resin can be firmly disposed on the base cloth to form the water-repellent fabric. For example, each of the ingredients in the first mixture may undergo a cross-linking reaction during the second thermal process.

In some embodiments, the base cloth of the water-repellent fabric has at least two layers. Specifically, the interlayers of the base cloth may be three-dimensional spaces naturally formed by yarns or fibers after being interwoven or stacked, and the yarns or fibers may be interwoven or entangled between the two layers of the base cloth. For example, when the base cloth of the water-repellent fabric is a woven fabric, the interlayers of the base cloth may be three-dimensional spaces formed by the interwoven warp yarns and weft yarns. For another example, when the base cloth of the water-repellent fabric is a knitted fabric, the interlayers of the base cloth may be three-dimensional spaces formed by the knitted loops. For further examples, when the base cloth of the water-repellent fabric is a non-woven fabric, the interlayers of the base cloth may be gaps formed by the stacking of yarns (or fibers). In some embodiments, the water-repellent resin is disposed between the two layers of the base cloth to be firmly disposed on the base cloth. In this regard, the water-repellent fabric can also wrap each yarn or fiber of the base cloth, so as to be disposed between the two layers of the base cloth.

After performing the above steps S10 to S40, the water-repellent fabric of the present disclosure can be obtained, and the water-repellent resin in the water-repellent fabric is firmly disposed on the base cloth. Since the water-repellent resin in the water-repellent fabric has zwitterionic groups derived from the choline, it can have a good anti-staining property. Furthermore, the water-repellent resin formed by the two-stage thermal process can form a complicated network structure on the fibers or yarns of the base cloth, such that the water-repellent resin is even more firmly disposed on the base cloth. Accordingly, the formed water-repellent fabric can be ensured to have good water repellency, anti-staining effect, and washing fastness. In addition, in the water-repellent fabric of the present disclosure, the zwitterionic group (hydrophilic group) derived from the choline is relatively close to the surface of the water-repellent fabric, while the water repellent is relatively far away from the surface of the water-repellent fabric, such that the water-repellent fabric has good water repellency and anti-staining effect.

It should be particularly noted that by the selection of the cross-linking agent and the setting of the reaction temperature of each of the first and second thermal processes in the present disclosure, the cross-linking agent and its derivatives produced during the thermal process can be ensured to undergo a segmented reaction. In detail, since the cross-linking agent of the present disclosure only partially reacts at a temperature of 90° C. to 120° C., and can completely react at a temperature of 120° C. to 150° C., the reaction temperatures of the first and second thermal processes are respectively set in the above range to ensure that portions of the cross-linking agent is preserved for a cross-linking reaction during the second thermal process. Accordingly, the subsequently formed water-repellent resin can have a complicated network structure, which is beneficial for improving the water repellency, the anti-staining effect, and the washing fastness of the water-repellent fabric.

In the following descriptions, features and effects of the present disclosure will be described more specifically with reference to some embodiments and comparative examples. It is noted that without exceeding the scope of the present disclosure, the materials used, their amount and ratio, processing details, processing flow, etc. can be appropriately alternated. Therefore, the present disclosure should not be interpreted restrictively by the embodiments provided below. The ingredients and their contents in each embodiment and comparative example are shown in Table 1. Each embodiment is fabricated through the aforementioned steps S10 to S40, in which the reaction temperature of the first thermal process is 110° C., and the reaction temperature of the second thermal process is 130° C.

TABLE 1

|  | base cloth | polyol | cross-linking agent | choline | water-repellent |
|---|---|---|---|---|---|
| comparative example 1 | PET knitted fabric | N/A | water-based bridging agent (1) | N/A | Rudolf Eco+ (9) |
| comparative example 2 | PET knitted fabric | N/A | water-based bridging agent (3) | N/A | Rudolf Eco+ (7) |
| comparative example 3 | PET knitted fabric | N/A | water-based bridging agent (5) | N/A | Rudolf Eco+ (5) |
| embodiment 1 | PET knitted fabric | PPG M.W. 400 (0.05) | water-based bridging agent (1) | (0.05) | Rudolf Eco+ (9) |
| embodiment 2 | PET knitted fabric | PEG M.W. 62 (0.15) | water-based bridging agent (3) | (0.15) | Rudolf Eco+ (7) |
| embodiment 3 | PET knitted fabric | PPG M.W. 400 (0.25) | water-based bridging agent (5) | (0.25) | Rudolf Eco+ (5) |
| embodiment 4 | PET knitted fabric | PTMEG M.W. 200 (0.35) | water-based bridging agent (7) | (0.35) | Rudolf Eco+ (3) |
| comparative example 4 | PET knitted fabric | N/A | water-based bridging agent (1) | N/A | P794W (10) |
| embodiment 5 | PET knitted fabric | PPG M.W. 400 (0.10) | water-based bridging agent (2) | (0.10) | P794W (8) |
| comparative example 5 | PET knitted fabric | N/A | water-based bridging agent (2) | N/A | HeiQ Eco-Dry (10) |
| embodiment 6 | PET knitted fabric | PEG M.W. 62 (0.10) | water-based bridging agent (2) | (0.10) | HeiQ Eco-Dry (8) |
| comparative example 6 | PET knitted fabric | N/A | water-based bridging agent (1) | N/A | Bio DWR 2.0 (10) |
| embodiment 7 | PET knitted fabric | PTMEG M.W. 200 (0.10) | water-based bridging agent (2) | (0.10) | Bio DWR 2.0 (8) |

Note 1:
The contents are shown in parentheses, and the unit of the content is parts by weight.
Note 2:
PEG, PPG, and PTMEG are purchased from Bayer.
Note 3:
Water-based bridging agent is purchased from Taiwan Textile Research Institute.
Note 4:
The term "M.W." stands for "molecular weight".

<Experiment: Water Repellency Test and Anti-Staining Test for Fabrics>

The water repellency test for each embodiment and each comparative example is performed under the AATCC 22 standard method, and the anti-staining test for each embodiment and each comparative example is performed under the AATCC 130 standard method. Among them, comparative examples 1-3 and embodiments 1-4 are subjected to 20 times of washing, comparative examples 4-6 and embodiments 5-7 are subjected to 50 times of washing, and the tests were performed again after $20^{th}$, $40^{th}$, and $50^{th}$ times of washing. The results are shown in Table 2.

TABLE 2

|  | number of washing (times) | water repellency (grade) | anti-staining property (grade) |
|---|---|---|---|
| comparative example 1 | 0 | 100 | w/o testing |
|  | 20 | 100 | 3 |
| comparative example 2 | 0 | 100 | w/o testing |
|  | 20 | 100 | 3 |
| comparative example 3 | 0 | 100 | w/o testing |
|  | 20 | 100 | 3 |
| embodiment 1 | 0 | 100 | w/o testing |
|  | 20 | 100 | 3 |
| embodiment 2 | 0 | 100 | w/o testing |
|  | 20 | 100 | 3.5 |
| embodiment 3 | 0 | 100 | w/o testing |
|  | 20 | 100 | 4 |
| embodiment 4 | 0 | 100 | w/o testing |
|  | 20 | 100 | 4 |
| comparative example 4 | 0 | 100 | 2.5 |
|  | 20 | 100 | 2.5 |
|  | 40 | 90 | 2 |
|  | 50 | 90 | 2 |
| embodiment 5 | 0 | 100 | 3 |
|  | 20 | 100 | 3 |
|  | 40 | 90 | 2.5 |
|  | 50 | 90 | 2.5 |
| comparative example 5 | 0 | 100 | 3.5 |
|  | 20 | 100 | 3 |
|  | 40 | 80 | 3 |
|  | 50 | 80 | 3 |
| embodiment 6 | 0 | 100 | 3.5 |
|  | 20 | 100 | 3 |
|  | 40 | 80 | 3 |
|  | 50 | 80 | 3 |
| comparative example 6 | 0 | 100 | 2.5 |
|  | 20 | 100 | 3 |
|  | 40 | 100 | 3 |
|  | 50 | 90 | 2.5 |
| embodiment 7 | 0 | 100 | 2.5 |
|  | 20 | 100 | 3 |
|  | 40 | 100 | 3 |
|  | 50 | 90 | 2.5 |

Reference is made to Table 1 and Table 2. It can be seen from comparative examples 1-3 and embodiments 1-4 that the addition of the polyol and the choline does help to improve the anti-staining property of the fabric, and when the content of the choline increases and the content of water repellent decreases, the fabric can be provided with a better anti-staining property. It can be seen from comparative examples 4-6 and embodiments 5-7 that the addition of the polyol, the cross-linking agent, and the choline does help to improve the anti-staining property of the fabric. On the other hand, all of the embodiments show good water repellency under testing, which indicates that the water-repellent fabric of the present disclosure not only has good water repellency, but also has a good anti-staining property, and can still show good water repellency and a good anti-staining performance after multiple times of washing, which successfully overcomes the problem of poor washing fastness caused by the use of conventional processing additives.

According to the aforementioned embodiments of the present disclosure, the water-repellent fabric of the present disclosure includes the base cloth and the water-repellent resin, and the water-repellent resin is firmly disposed on the base cloth, thereby improving the water repellency, the anti-staining effect, and the washing fastness of the water-repellent fabric. During the fabricating process of the water-repellent fabric, the cross-linking agent can be ensured to undergo a segmented reaction by adjusting the reaction temperature of each stage of the two-stage thermal process, such that the subsequently formed water-repellent resin has a complicated network structure, which is beneficial for improving the water repellency, the anti-staining effect, and the washing fastness of the water-repellent fabric. Accordingly, the water-repellent fabric of the present disclosure can maintain its functions well after multiple times of washing, and can be widely used in the field of functional apparel textiles.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A water-repellent fabric, comprising:
    a base cloth;
    a water-repellent resin disposed on the base cloth, wherein a method of fabricating the water-repellent resin comprises:
    performing a first thermal process, such that a polyol, a cross-linking agent, and a choline are reacted to form a first mixture, wherein a reaction temperature of the first thermal process is between 90° C. and 120° C.; and
    performing a second thermal process, such that the first mixture and a water repellent are reacted to form the water-repellent resin, wherein the water repellent comprises a hydroxyl group, an amino group, or combinations thereof, and a reaction temperature of the second thermal process is between 120° C. and 150° C.

2. The water-repellent fabric of claim 1, wherein the cross-linking agent comprises a structural unit represented by formula (1),

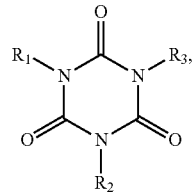

formula (1)

wherein any two or more of the $R_1$, $R_2$, and $R_3$ comprises a structural unit represented by formula (2),

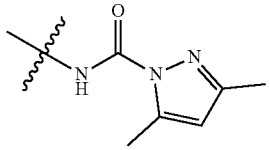

formula (2)

3. The water-repellent fabric of claim 1, wherein the base cloth has a plurality of yarns interwoven with each other, and the water-repellent resin wraps each of the yarns.

4. The water-repellent fabric of claim 1, wherein the base cloth has at least two layers, and the water-repellent resin is disposed between the two layers of the base cloth.

5. A fabricating method of a water-repellent fabric, comprising:
performing a first thermal process to mix a polyol, a cross-linking agent, and a choline are reacted to form a first mixture, wherein a reaction temperature of the first thermal process is between 90° C. and 120° C.;
mixing the first mixture and a water repellent, such that a second mixture is formed, wherein the water repellent comprises a hydroxyl group, an amino group, or combinations thereof;
dipping a base cloth in the second mixture, such that the second mixture covers the base cloth and infiltrates into the base cloth; and
performing a second thermal process, such that the second mixture is reacted to formed a water-repellent resin, and the water-repellent resin is disposed on the base cloth, wherein a reaction temperature of the second thermal process is between 120° C. and 150° C.

6. The fabricating method of the water-repellent fabric of claim 5, wherein in the first thermal process, the cross-linking agent reacts with the polyol and the choline, such that the first mixture is formed.

7. The fabricating method of the water-repellent fabric of claim 5, wherein performing the first thermal process comprises:
performing a first front-end thermal process to mix the polyol and the cross-linking agent, such that a first precursor is formed; and
performing a first back-end thermal process to mix the choline and the first precursor, such that the first mixture is formed.

8. The fabricating method of the water-repellent fabric of claim 5, wherein a reaction time of the first thermal process is between 20 minutes and 30 minutes, and a reaction time of the second thermal process is between 2 minutes and 5 minutes.

9. A water-repellent resin, fabricated by a fabricating method comprising the following steps:
performing a first thermal process, such that a polyol, a cross-linking agent, and a choline are reacted to form a first mixture, wherein a reaction temperature of the first thermal process is between 90° C. and 120° C.; and
performing a second thermal process, such that the first mixture and a water repellent are reacted to form the water-repellent resin, wherein the water repellent comprises a hydroxyl group, an amino group, or combinations thereof, and a reaction temperature of the second thermal process is between 120° C. and 150° C.

10. The water-repellent resin of claim 9, wherein an average molecular weight of the polyol is between 60 g/mole and 400 g/mole.

\* \* \* \* \*